United States Patent [19]

Duch et al.

[11] Patent Number: 5,230,008
[45] Date of Patent: Jul. 20, 1993

[54] MULTI-AMPLITUDE SAMPLE GENERATING APPARATUS AND METHOD

[75] Inventors: Krzysztof M. Duch, Hoffman Estates; Thomas A. Freeburg, Arlington Heights, both of Ill.

[73] Assignee: Motorola, Inc., Schaumburg, Ill.

[21] Appl. No.: 644,186

[22] Filed: Jan. 18, 1991

[51] Int. Cl.[5] ............................................. H04L 25/49
[52] U.S. Cl. ....................................... 375/19; 341/56
[58] Field of Search ...................... 375/17, 19; 328/14, 328/18; 360/40; 341/56

[56] References Cited

U.S. PATENT DOCUMENTS

| | | | |
|---|---|---|---|
| 3,267,459 | 8/1966 | Chomicki et al. | 375/17 |
| 3,369,181 | 2/1968 | Braymer | 375/17 |
| 3,665,475 | 5/1972 | Thayer | 375/17 |
| 3,760,276 | 9/1973 | Shenier | 375/17 |
| 3,946,214 | 3/1976 | Stuart et al. | 333/28 R |
| 4,566,044 | 1/1986 | Langdon, Jr. et al. | 360/40 |
| 4,617,645 | 10/1986 | Sprague | 365/45 |
| 4,710,891 | 12/1987 | Debus, Jr. et al. | 364/718 |
| 4,718,030 | 1/1988 | Tsutsumi | 364/721 |
| 4,775,851 | 10/1988 | Borth | 341/155 |

Primary Examiner—Stephen Chin
Attorney, Agent, or Firm—Richard A. Sonnentag; Raymond J. Warren

[57] ABSTRACT

An apparatus scales binary samples representing a predetermined waveform (109) to achieve every possible transition in a multi-level transmission system. The predetermined waveform (109) is partitioned into M symbol intervals, each symbol interval having a corresponding waveform represented by a series of binary samples V stored in M separate ROM devices (311-316). Depending on the required amplitude and polarity of the transition, logic blocks (351-356) control scaling multipliers (321-326) and polarity multipliers (331-336) to perform the required scaling and inverting of the binary samples retrieved from ROM (311-316). The scaled and inverted samples are added together by an adder (345) and sent to a D/A converter (350) where the desired scaled and inverted waveform is converted/generated from the scaled and inverted binary samples.

29 Claims, 4 Drawing Sheets

FIG.1A PREDETERMINED ANALOG WAVEFORM
106 OVERSAMPLING V=4
SYMBOL INTERVALS
SYMBOL INTERVALS
100

ANALOG WAVEFORM TRUNCATED TO M=6 SYMBOL INTERVALS
113
111  115
109 WAVEFORM MULTIPLIED BY +1
T1 T2 T3 T4 T5 T6
112  114

110 WAVEFORM MULTIPLIED BY -1

120 WAVEFORM SCALED BY -1/4

FIG. 2A
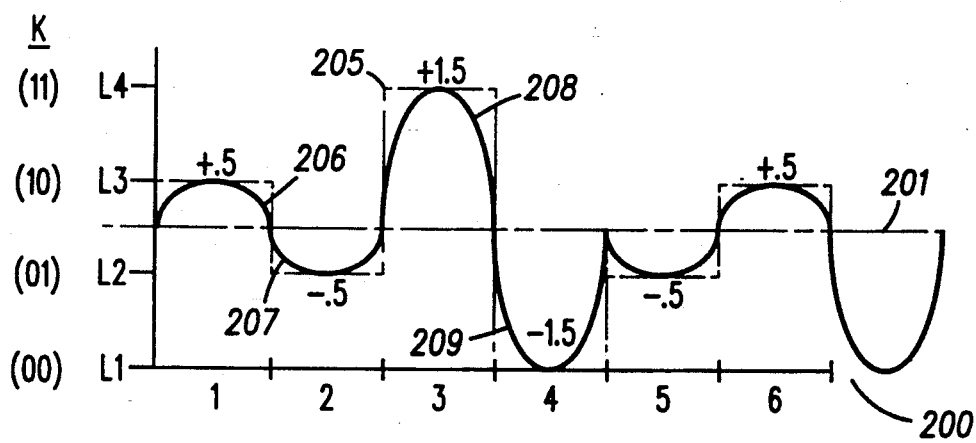
FIG. 2B
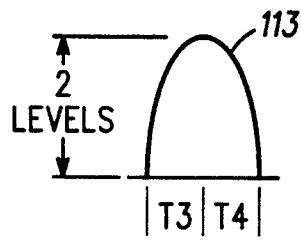
FIG. 4
| BINARY VALUE K FOR INCOMING LEVEL | | Xa MULTIPLIER SCALES BY: | Xb MULTIPLIER: |
|---|---|---|---|
| | 00 (L1) | +3/4 | INVERTS DATA |
| | 01 (L2) | +1/4 | INVERTS DATA |
| | 10 (L3) | +1/4 | POSSES DATA |
| | 11 (L4) | +3/4 | POSSES DATA |

MULTI-AMPLITUDE SAMPLE GENERATING APPARATUS AND METHOD

FIELD OF THE INVENTION

The invention relates to digital synthesis of pulse shapes and more specifically, to digital synthesis of pulse shapes in a multi-level transmission system using look-up tables.

BACKGROUND OF THE INVENTION

A digital synthesis technique is frequently used to implement pulse shaping circuitry. In a multi-level transmission system, a typical desired pulse shape may extend over a long period of time but for practical reasons is truncated to M separate intervals in order to be stored in read-only-memory (ROM). The ROM stores information representing pulse shapes (in the form of binary samples) for each of M intervals. For example, on L-level transmission system requires L different sets of shapes. Consequently, this approach requires M (the number of intervals in time) times L (the number of levels in volts) ROM storage devices. Depending on the number of intervals M and the number of levels L, the total number of ROM memory devices can be quite high.

In digital synthesis of pulse shapes, the samples retrieved from ROM that represent the predetermined pulse shapes are typically weighted depending on symbol weighting factors for each level L. The weighting is typically performed by digital multipliers which generally requires complex circuitry to implement which in turn can become quite expensive.

Thus, a need exists for a digital synthesizer that reduces memory requirements and also eliminates the need for complex multipliers to perform weighting of binary samples.

SUMMARY OF THE INVENTION

An apparatus selectively generates a desired multi-amplitude sample set from a single generic sample set. The apparatus stores the single generic sample set having predetermined polarity and amplitude characteristics generated relative to a predetermined amplitude reference and determines a numerical value corresponding to the amplitude characteristic of the desired multi-amplitude sample set and the polarity of the desired multi-amplitude sample set amplitude characteristic relative to the predetermined amplitude reference. The apparatus changes the amplitude characteristic of the generic sample set in proportion to the numerical value and inverts the polarity of the changed amplitude characteristic if the polarity of the desired multi-amplitude sample set amplitude characteristic is opposite the polarity of the amplitude characteristic of the generic sample set.

BRIEF DESCRIPTION OF THE DRAWINGS

FIG. 2A illustrates transitions of one pulse of the analog waveform in FIG. 1 in a four-level transmission system while FIG. 2B depicts the one pulse which is the pulse of symbol intervals T3 and T4 as shown in FIG. 1B.

FIG. 4 is a table correlating the digital representation of a transition level and the resulting multiplier output for a 4-level system.

DETAILED DESCRIPTION OF A PREFERRED EMBODIMENT

Figure 1B:
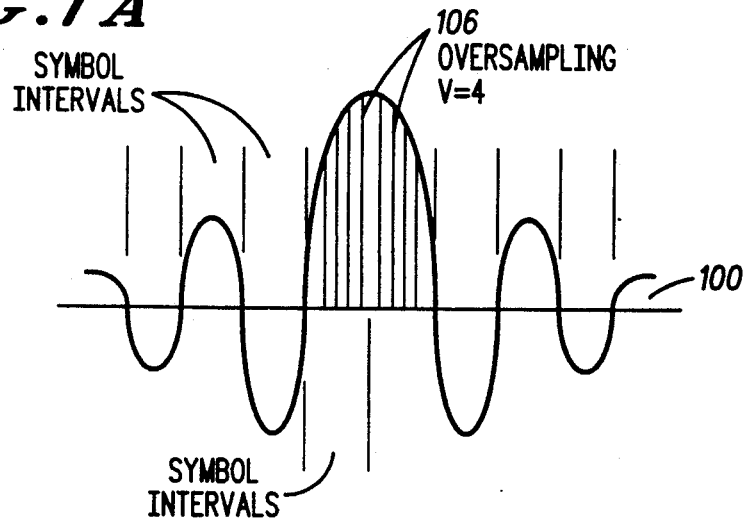
FIG. 1B depicts the waveform of 1A truncated to six symbol intervals.
Figure 1B:
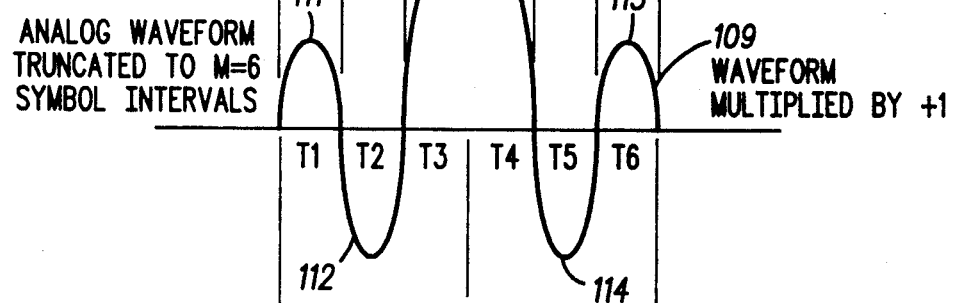
Figure 1C:
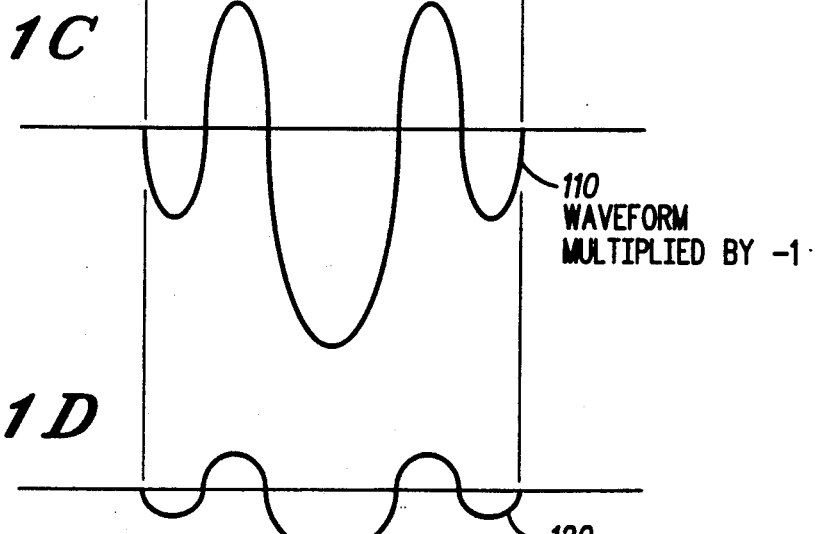
FIG. 1C depicts the waveform of 1B multiplied by $-1$, and FIG. 1D generally depicts the waveform of 1C scaled by $\frac{1}{4}$.
Figure 1D:
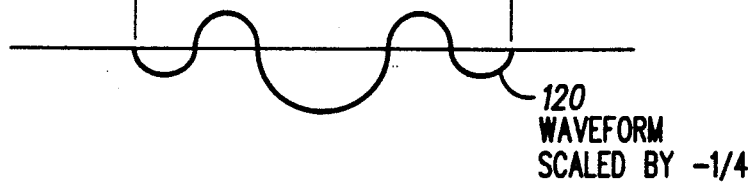
FIG. 1A generally depicts an analog waveform having predetermined characteristics.

In multi-level transmission systems, analog pulses are used to represent transitions between levels. FIG. 1A generally depicts a predetermined analog waveform 100 which, depending on the level of transmission required, is typically weighted by a specific symbol value (reflecting the transmission level of the symbol). The shape of the pulse 100 is selected to meet certain predetermined limitations (e.g. frequency spectrum, inter-symbol interference). As can be seen, the waveform 100 extends over a long period of time and for practical reasons, is truncated to M symbol intervals resulting in truncated waveform 109 as shown in FIG. 1B. For waveform 109 to be represented digitally and stored in read-only-memory (ROM), it must first undergo quantization in both the time and voltage domain. The quantization in the time domain is defined by the number of samples 106 taken during each symbol interval T1–T6 and is called the oversampling factor, V. Since the length of waveform 109 is longer than the time between adjacent symbols T1–T6, an overlapping of symbols T1–T6 takes place, thus the final waveform 109 is a superposition of smaller pulses 111–115 which are time displaced by a symbol interval T1–T6, truncated to M intervals and multiplied by a weighting factor according to the weight associated with each symbol T1–T6. Waveform 109 represents predetermined waveform 100 truncated to six symbol intervals T1–T6 and essentially multiplied by $+1$. Typically, multiplying by a weighting factor also requires inversion of the analog pulse which in effect results in a waveform 110 in FIG. 1C multiplied by $-1$. Multiplying waveform 109 by a numerical value or scale factor such as $-\frac{1}{4}$ yields a scaled waveform 120 shown in FIG. 1D. Waveform 109 can be multiplied by any factor to either scale or expand it.

FIG. 2A depicts a typical transmission in a multi-level transmission system where a series of pulses are shown in a voltage versus time diagram. The diagram represents a four-level system where the dashed line 205 reveals ideal pulses transitioning every two symbol intervals. In a L-level transmission system, the number of binary bits that can be represented by each level is $\log_2 L$, thus in the preferred embodiment, each level is represented by a different 2-bit digital word. In FIG. 2B, waveform 113 extends for two symbol intervals T3 and T4. For this example, assume that waveforms 111, 112, 114 and 115 do not cause any inter-symbol interference and that the majority of energy and consequently information is contained in waveform 113. By setting the voltage reference 201 so that it equally divides the voltage levels and assigning waveform 113 a predetermined amplitude as that between two levels, say L2 to L4, any of the waveforms 206-209 shown in FIG. 2A can be generated by scaling the generic sample set or the binary oversampling pulses which represent waveform 113 by a known scale factor and inverting the scaled pulses when the desired amplitude polarity is opposite the amplitude of the generic sample set. It is significant to note that if the voltage reference is chosen to be level L1 or L4, polarity inversion of the desired sample set is not necessary if the desired sample set polarity is the same as the generic sample set polarity. Continuing, to generate waveform 206, the binary oversampling pulses representing waveform 113 can be divided by four or in effect multiplied by $+\frac{1}{4}$. Likewise, to generate waveform 207, the pulses representing waveform 113 can be multiplied by $-\frac{1}{4}$. It should be clear that waveform 208 can be generated by multiplying the pulses representing waveform 113 by $+\frac{3}{4}$ and waveform 209 generated by multiplying the pulses representing waveform 113 by $-\frac{3}{4}$. Using this technique, any of the desired waveforms 206-209 shown in FIG. 2A can be generated from one generic set of oversampling pulses representing waveform 113. Although not represented in FIG. 2B, waveforms 111, 112, 114 and 115 are still present and undergo scaling as does waveform 113. The end effect is an overlap of waveforms into adjacent transitions periods, as shown in FIG. 2A, which contributes to the problem of inter-symbol interference.

The advantage to this technique is a L:1 reduction in memory size, where L is the number of levels in the system. This is true since, if scaling were not incorporated, a binary representation of all four separate waveforms 206-209 would have to be stored in ROM. The memory size required would be the oversampling factor, V, for each pulse multiplied by the number of levels, L. The total memory requirement has to take into account all symbol intervals M that are used to generate the truncated pulse shape 109, thus, the required memory size is $V*L*M$.

Figure 3:
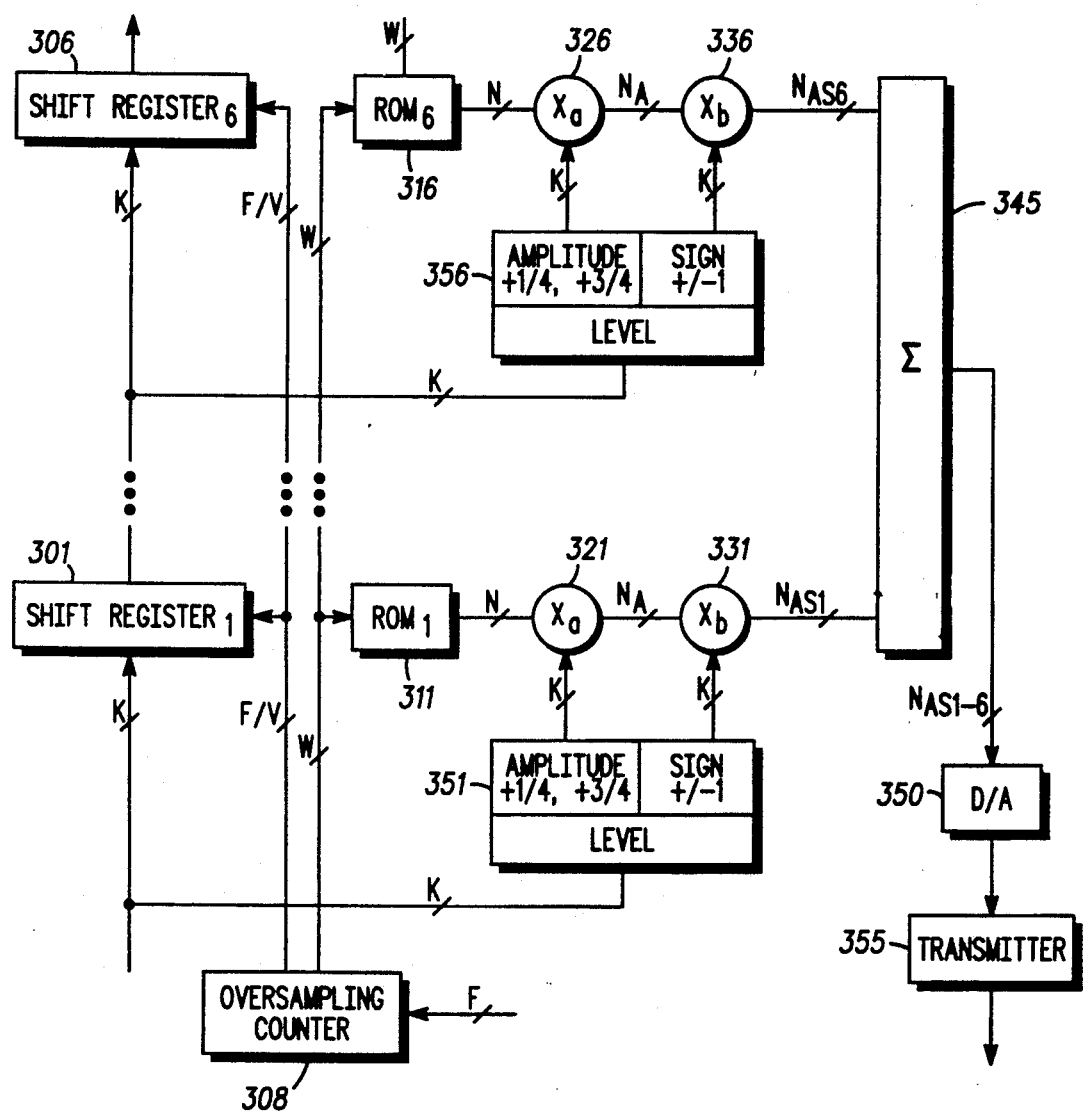
FIG. 3 depicts generally the hardware implementation of generating all required pulses from one predetermined pulse in accordance with the invention.

FIG. 3 is an illustrative embodiment of the invention performing scaling to produce the waveforms 206-209 from the pulses representing waveform 113. The time displacement, as stated earlier, between adjacent symbol intervals T1-T6 of waveform 109 is accomplished through shift registers 301-306 where passing symbols T1-T6 recall from memory binary information in the form of samples 106 representing predetermined pulses 111-115. Input to the shift register is a K-bit parallel bus, where K is $\log_2 L$ bits. In the preferred embodiment, K=2 since the number of levels in the system is four. Continuing, the 2 bits entering the shift registers 301-306 give a digital representation of every level L1 through L4 shown in FIG. 2. The hardware in FIG. 3 also includes six ROM devices 311-316, where each ROM device 311-316 contains samples 106 representing waveforms 111-115 respectively; for example device 311 contains samples representing waveform 111, device 312 contains samples representing waveform 112, etc. Input to the ROM 311-316 is a W-bit parallel bus, where W is $\log_2 V$ bits. The output W is generated from an oversampling counter 308 which has as input a clock frequency F. The oversampling counter 308 also supplies the shift registers 301-306 with inputs, thus synchronizing the time displacement between adjacent symbol intervals T1-T6 and sample retrieval from rom 311-306. Output from ROM 311-316 is a N-bit parallel bus which is input into a multiplier ($X_a$) 321-326 where depending on the required amplitude, the samples in the ROMs that correspond to waveforms 111-115 are altered or scaled by the required scale factor. The scaled N-bits exiting $X_a$ 321-326 are input into another multiplier ($X_b$) 331-336 where, depending on the required waveform polarity, they are inverted or multiplied by $\pm 1$. Output from the $X_b$ multipliers 331-336 is input into an adder 345 which adds the scaled and time shifted samples. Output from the adder 345 is input into a digital-to-analog converter 350 which converts the scaled binary samples into a scaled analog waveform. The output of the D/A converter is the desired scaled waveforms 206-209 which is input into a transmitter 355 for transmission to peripheral equipment.

FIG. 4 depicts a logic table that illustrates the process that logic blocks 351-356 in FIG. 3 undergo to control multipliers $X_a$ 321-326 and multipliers $X_b$ 331-336. Referring to FIG. 2A, it can be seen that level L1 is represented in binary form by 00, L2 by 01, L3 by 10 and finally L4 by 11. The binary representation can change dynamically per symbol interval depending on the convention of mapping used. Continuing, if the K-bits entering the logic blocks is "00", multiplier $X_a$ 321-326 scales the generic samples representing the predetermined waveforms 111-115 by $+\frac{3}{4}$ and multiplier $X_b$ 331-336 multiplies the scaled samples by $-1$. Likewise, if the K-bits entering the logic blocks is "01", multiplier $X_a$ 321-326 scales the generic samples representing the predetermined waveforms 111-115 by $+\frac{1}{4}$ and multiplier $X_b$ 331-336 multiplies the scaled samples by $-1$. The process continues for the cases where K is 10 and 11 as shown in FIG. 4.

Figure 5:
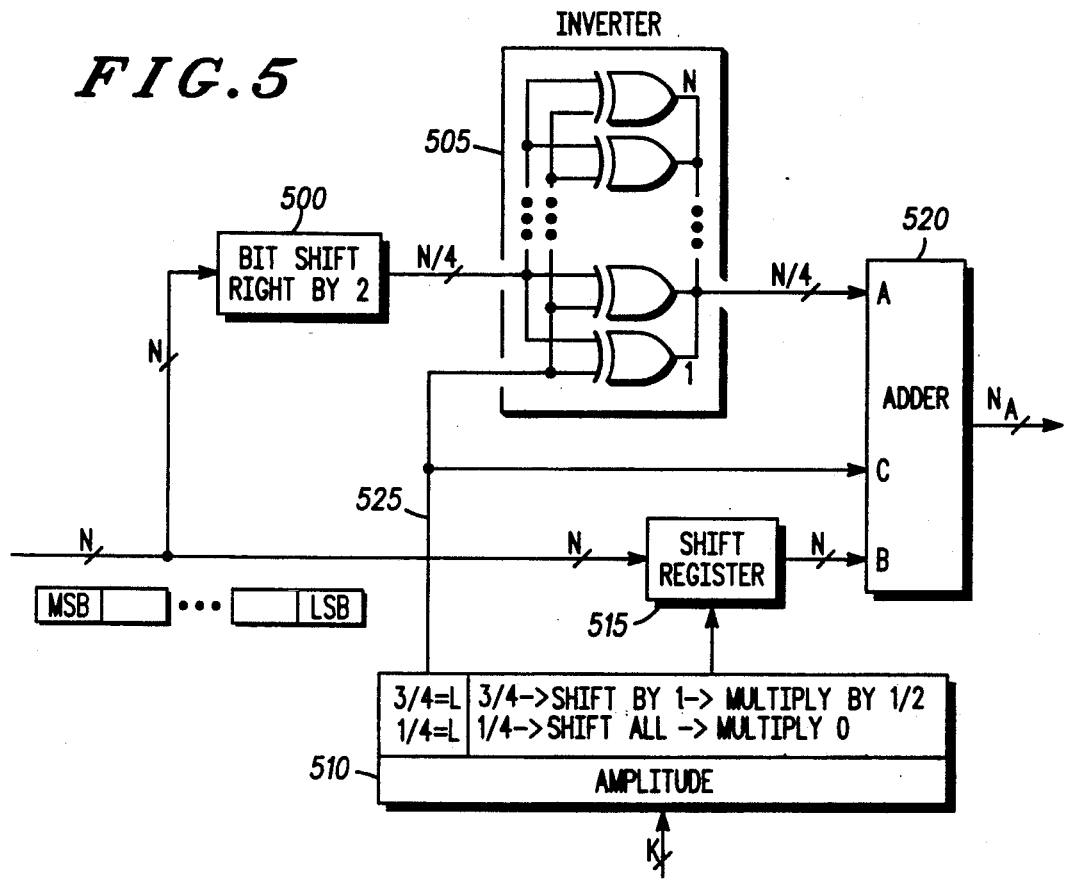
FIG. 5 depicts the hardware implementation of scaling binary data representing a predetermined pulse in accordance with the invention.

FIG. 5 generally depicts the hardware implementation of multiplier $X_a$. The N-parallel bits retrieved from ROM are split and one of two split pairs is simply shifted right by 2. In the binary domain, shifting a parallel bit pattern by 2 is essentially the same as multiplying the corresponding binary value by $+\frac{1}{4}$. The output of the shift register 500 is input into an inverter 505 which is made up of N separate exclusive OR (XOR) gates. The N-parallel bits are individually XOR'd with another signal which is set depending on the amplitude requirement of the transition. Logic block 510 sets it output line 525 to logic level "0", thus, the shifted N-parallel bits will simply pass through the inverter without being inverted. In the preferred embodiment, the output line 525 from the logic block 510 is always low since inversion of the shifted N-bits is not necessary.

The second group of N-parallel bits that was split is input into a shift register 515, but this shift register 515 is not hard-wired to shift by a predetermined amount. The amount that the shift register 515 will shift the N-parallel bits depends on the amplitude of the transition required. For example, if the amplitude of the transition is required to be $\frac{3}{4}$'s of the predetermined waveform, logic block 510 will control the shift register 515 to simply shift the N-parallel bits by 1 bit or essentially multiply the corresponding binary value of the N-parallel bits by $\frac{1}{2}$. The output of shift register 515 is input into an adder 520 which has as inputs an A, B, and C ports. The output of the shift register 515 is input into the B port while the output from inverter 505 in input into the A port. A separate line which is tied to output line 525 is input into the C port or CARRY port of the adder 520. In the preferred embodiment, the carry line will be logic low or a "0", thus, enabling the adder to simply add the two inputs. At the output of the adder 520, the first N-parallel bits multiplied by $\frac{1}{4}$ have been added to the second N-parallel bits multiplied by $\frac{1}{2}$ yielding the $N_A$-parallel bits appropriately scaled by $\frac{3}{4}$. The entire process is essentially the same if the amplitude of the transition is required to by $\frac{1}{4}$ of the predetermined waveform. In this case, logic block 510 controls the shift register 515 to shift all the bits, essentially multiplying the binary value of the N-parallel bits by 0. This is input into the B port of the adder 520 yielding the result at the output of the adder of the N-parallel bits appropriately multiplied by $\frac{1}{4}$.

Figure 6:
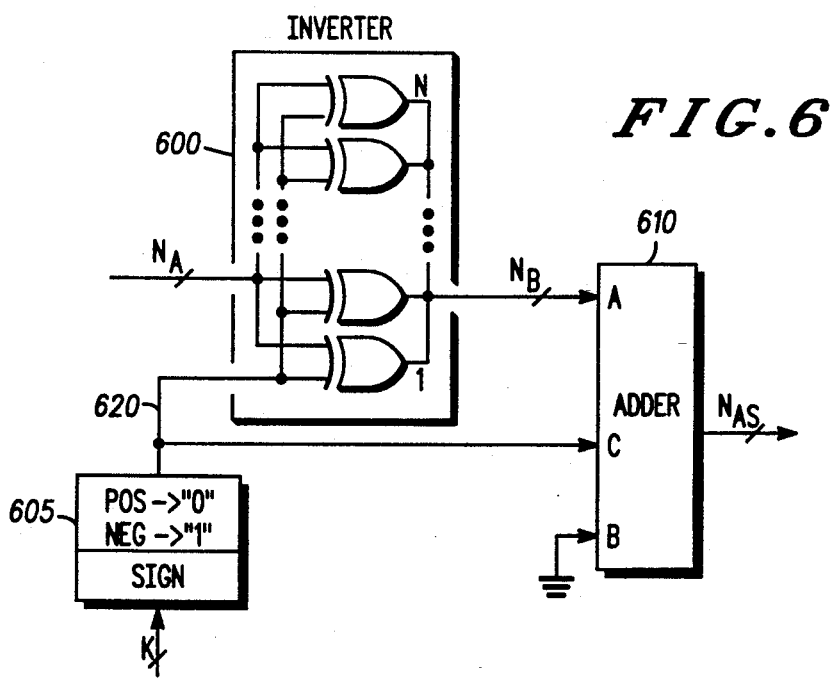
FIG. 6 depicts the hardware implementation of inverting binary data representing a predetermined pulse in accordance with the invention.

FIG. 6 generally depicts the hardware implementation of multiplier $X_b$. The $N_A$-parallel bits output from the adder 520 in FIG. 5 are input into an inverter 600 which again contains N separate XOR gates. It is important to realize here, that the representation of N and $N_A$ is used to distinguish the scaled bits $N_A$ from the non-scaled bits N. The number of bits in N and $N_A$ are the same. Continuing, the signal that the $N_A$-parallel bits are XOR'd with is now a signal which is dependent on the polarity of the transition. Since the predetermined waveform 109 is positive, if the transition required is positive, logic block 605 will set its output line 620 to logic level "0" and thus, the $N_A$-parallel bits simply pass through the inverter 600 unchanged. If the required transition is negative however, logic block 605 will set its output line to logic level "1", thus causing the bits from 1 to $N_A$ to invert or essentially generate the 1's complement. The output of the inverter, in either case, is $N_B$-parallel bits which are input into the A port of an adder 610 which has as input to the B port ground or logic level "0". The CARRY line or C'port of the adder 610 gets its logic level again from the output line 620 of logic block 605. As above, if the required transition is positive, the output line 620 gets set to logic level "0" and the adder simply adds all 0's to the $N_B$-parallel bits or essentially passes bits unchanged. If the transition required is negative, the output line 620 gets set to logic level "1" and the adder adds a 1 to the $N_B$-bits. By adding a "1" to the inverted bits, the adder 610 is generating the 2's complement of the $N_A$-parallel bits input into the inverter. Output from the adder 610 is $N_{AS}$-bits which is either the $N_A$-bits or the 2's complement of the $N_A$-bits as required.

Using the technique and hardware of FIGS. 3 and 4, all potential transitions in an L-level transmission system can be generated from one generic waveform having predetermined amplitude, frequency, and inter-symbol interference characteristics. For an 8-level transmission system, the amplitudes require scaling by $+\frac{1}{8}$, $+\frac{3}{8}$, $+\frac{5}{8}$ and $+162$ and multiplication by $+/-1$. It should be clear that for an 8-level system, K is represented by 3 bits of information, 000 through 111. In this case however, the hardware operation of FIG. 3 is identical other than the amplitude section of logic blocks 351-356 where the amplitudes change to the above mentioned scale factors. For an 8-level transmission system, the hardware operation of FIG. 5 changes in that shift register 500 becomes a 3 bit shift to the right while the amplitudes in logic block 510 also change to the above mentioned scale factors. The hardware in FIG. 6 does not change when changing from a 4-level to an 8-level system. This method of using one generic waveform 109 to produce all potential transitions in a L-level transmission system realizes a L:1 reduction in required memory size by eliminating the need for a separate waveform for every potential transition and also removes the requirement for complex multipliers to perform the necessary scaling.

What we claim is:

1. An apparatus for selectively generating a desired multi-amplitude sample set from a single generic sample set, the apparatus comprising:
   means for storing the single generic sample set having predetermined polarity and amplitude characteristics generated relative to a predetermined amplitude reference;
   means for determining a numerical value corresponding to the amplitude characteristic of said desired multi-amplitude sample set and the polarity of said desired multi-amplitude sample set amplitude characteristic relative to said predetermined amplitude reference;
   means for changing the amplitude characteristic of said generic sample set in proportion to said numerical value; and
   means for inverting the polarity of said amplitude characteristic if the polarity of the desired multi-amplitude sample set amplitude characteristic is opposite the polarity of the amplitude characteristic of said generic sample set.

2. The apparatus of claim 1 wherein said means for changing further comprises means for dividing said generic sample set into a first generic sample set and a second generic sample set.

3. The apparatus of claim 2 wherein said desired sample set corresponds to a predetermined number of bits contained in one time interval and said means for changing further comprises means for shifting in time said first generic sample set by a number of samples equal to the number of bits per interval to produce a first shifted generic sample set.

4. The apparatus of claim 3 wherein said desired sample set corresponds to a predetermined number of bits contained in one time interval and said means for changing further comprises means, responsive to said means for determining, for shifting in time said second generic sample set by at most $\log_2 L$ number of bits per interval, where L corresponds to twice the number of amplitudes said desired sample set may have, to produce a second shifted generic sample set.

5. The apparatus of claim 4 wherein said means for changing further comprises means, coupled to said means for determining, for adding said first shifted generic sample set and said second shifted generic sample set to produce a sum of said first shifted generic sample set and said second shifted generic sample set.

6. The apparatus of claim 5 wherein said means for changing further comprises means, coupled to said first set shifting means, for inverting said sum of said first shifted generic sample set and said second shifted generic sample set if the polarity of the desired multi-amplitude sample set amplitude characteristic is opposite the polarity of the amplitude characteristic of said generic sample set.

7. The apparatus of claim 6 wherein said means for inverting further comprises means for toggling each of said predetermined number of bits contained in one time interval if the polarity of the desired multi-amplitude sample set amplitude characteristic is opposite the polarity of the amplitude characteristic of said generic sample set.

8. A transmitter employing an apparatus for generating L multi-amplitude sample sets from a generic sample set of V samples, the transmitter comprising:
   means for storing V separate generic samples having predetermined polarity and amplitude characteristics generated relative to a predetermined amplitude reference;

means for determining a numerical value corresponding to the amplitude characteristic of one of said L multi-amplitude sample sets and the polarity of said one multi-amplitude sample set amplitude characteristic relative to said predetermined amplitude reference;

means for changing the amplitude characteristic of said V samples in proportion to said numerical value;

means for inverting the polarity of said amplitude characteristic if said polarity of said one multi-amplitude sample set is opposite the polarity of the amplitude characteristic of said generic set;

means, coupled to said means for inverting, for adding said V samples to produce a composite sample set;

means for converting said composite sample set to an analog waveform having predetermined time and frequency domain characteristics; and means for transmitting said analog waveform.

9. The transmitter of claim 8 wherein said means for changing further comprises means for dividing said generic sample set into a first generic sample set and a second generic sample set.

10. The transmitter of claim 9 wherein at least one of said L sample sets corresponds to a predetermined number of bits contained in one time interval and said means for changing further comprises means for shifting in time said first generic sample set by a number of samples equal to the number of bits per interval to produce a first shifted generic sample set.

11. The transmitter of claim 10 wherein at least one of said L sample sets corresponds to a predetermined number of bits contained in one time interval and said means for changing further comprises means, responsive to said means for determining, for shifting in time said second generic sample set by at most $\log_2 L$ number of bits per interval, where L corresponds to twice the number of amplitudes said desired sample set may have, to produce a second shifted generic sample set.

12. The transmitter of claim 11 wherein said means for changing further comprises means, coupled to said means for determining, for adding said first shifted generic sample set and said second shifted generic sample set to produce a sum of said first shifted generic sample set and said second shifted generic sample set.

13. The transmitter of claim 12 wherein said means for changing further comprises means, coupled to said first set shifting means, for inverting said sum of said first shifted generic sample set and said second shifted generic sample set if the polarity of the L multi-amplitude sample set amplitude characteristic is opposite the polarity of the amplitude characteristic of said generic sample set.

14. The transmitter of claim 8 wherein said means for inverting further comprises means for toggling each of said predetermined number of bits contained in one time interval if the polarity of the L multi-amplitude sample set amplitude characteristic is opposite the polarity of the amplitude characteristic of said generic sample set.

15. The transmitter of claim 8 wherein said means for converting further comprises a digital-to-analog converter.

16. A method of selectively generating a desired multi-amplitude sample set from a single generic sample set, the method comprising:

storing the single generic sample set having predetermined polarity and amplitude characteristics generated relative to a predetermined amplitude reference;

determining a numerical value corresponding to the amplitude characteristic of said desired multi-amplitude sample set and the polarity of said desired multi-amplitude sample set amplitude characteristic relative to said predetermined amplitude reference;

changing the amplitude characteristic of said generic sample set in proportion to said numerical value; and inverting the polarity of said amplitude characteristic if the polarity of the desired multi-amplitude sample set amplitude characteristic is opposite the polarity of the amplitude characteristic of said generic sample set.

17. The method of claim 16 wherein said step of changing further comprises the step of dividing said generic sample set into a first generic sample set and a second generic sample set.

18. The method of claim 17 wherein said desired sample set corresponds to a predetermined number of bits contained in one time interval and said step of changing further comprises the step of shifting in time said first generic sample set by a number of samples equal to the number of bits per interval to produce a first shifted generic sample set.

19. The method of claim 18 wherein said desired sample set corresponds to a predetermined number of bits contained in one time interval and said step of changing further comprises the step, responsive to said step of determining, of shifting in time said second generic sample set by at most $\log_2 L$ number of bits per interval, where L corresponds to twice the number of amplitudes said desired sample set may have, to produce a second shifted generic sample set.

20. The method of claim 19 wherein said step of changing further comprises the step, coupled to said step of determining, of adding said first shifted generic sample set and said second shifted generic sample set to produce a sum of said first shifted generic sample set and said second shifted generic sample set.

21. The method of claim 20 wherein said step of changing further comprises the step, coupled to said first set shifting step, of inverting said sum of said first shifted generic sample set and said second shifted generic sample set if the polarity of the desired multi-amplitude sample set amplitude characteristic is opposite the polarity of the amplitude characteristic of said generic sample set.

22. The method of claim 21 wherein said step of inverting further comprises the step of toggling each of said predetermined number of bits contained in one time interval if the polarity of the desired multi-amplitude sample set amplitude characteristic is opposite the polarity of the amplitude characteristic of said generic sample set.

23. A method of transmission which generates L multi-amplitude sample sets from a generic sample set of V samples, the method comprising:

storing V separate generic samples having predetermined polarity and amplitude characteristics generated relative to a predetermined amplitude reference;

determining a numerical value corresponding to the amplitude characteristic of one of said L multi-amplitude sample sets and the polarity of said one multi-amplitude sample set amplitude characteristic relative to said predetermined amplitude reference;

changing the amplitude characteristic of said V samples in proportion to said numerical value;

inverting the polarity of said amplitude characteristic if said polarity of said one multi-amplitude sample set is opposite the polarity of the amplitude characteristic of said generic set;

adding, coupled to said step of inverting, said V samples to produce a composite sample set;

converting said composite sample set to an analog waveform having predetermined time and frequency domain characteristics; and transmitting said analog waveform.

24. The method of claim 23 wherein said step of changing further comprises the step of dividing said generic sample set into a first generic sample set and a second generic sample set.

25. The method of claim 24 wherein at least one of said L sample sets corresponds to a predetermined number of bits contained in one time interval and said step of changing further comprises the step of shifting in time said first generic sample set by a number of samples equal to the number of bits per interval to produce a first shifted generic sample set.

26. The method of claim 25 wherein at least one of said L sample sets corresponds to a predetermined number of bits contained in one time interval and said step of changing further comprises the step, responsive to said step of determining, of shifting in time said second generic sample set by at most $\log_2 L$ number of bits per interval, where L corresponds to twice the number of amplitudes said desired sample set may have to produce a second shifted generic sample set.

27. The method of claim 26 wherein said step of changing further comprises the step, coupled to said step of determining, of adding said first shifted generic sample set and said second shifted generic sample set to produce a sum of said first shifted generic sample set and said second shifted generic sample set.

28. The method of claim 27 wherein said step of changing further comprises the step, coupled to said first set shifting step, of inverting said sum of said first shifted generic sample set and said second shifted generic sample set if the polarity of the L multi-amplitude sample set amplitude characteristic is opposite the polarity of the amplitude characteristic of said generic sample set.

29. The method of claim 23 wherein said step of inverting further comprises the step of toggling each of said predetermined number of bits contained in one time interval if the polarity of the L multi-amplitude sample set amplitude characteristic is opposite the polarity of the amplitude characteristic of said generic sample set.

* * * * *